US012759119B2

(12) United States Patent
Wu et al.

(10) Patent No.: US 12,759,119 B2
(45) Date of Patent: Oct. 13, 2026

(54) TORQUE WRENCH WIRE HOLDER

(71) Applicant: STANLEY BLACK & DECKER MEA FZE, Jebel Ali (AE)

(72) Inventors: Yen-Ting Wu, Taoyuan (TW); Ko Han Chen, Taichung (TW); Chia Cheng Chen, Taichung (TW); Yi Tung Chan, Taichung (TW); Chihchiang Lee, Taichung (TW)

(73) Assignee: Stanley Black & Decker MEA FZE, Dubai (AE)

( * ) Notice: Subject to any disclaimer, the term of this patent is extended or adjusted under 35 U.S.C. 154(b) by 354 days.

(21) Appl. No.: 18/429,333

(22) Filed: Jan. 31, 2024

(65) Prior Publication Data

US 2024/0253191 A1 Aug. 1, 2024

(30) Foreign Application Priority Data

Feb. 1, 2023 (EP) .................................... 23154461

(51) Int. Cl.
*B25B 23/142* (2006.01)

(52) U.S. Cl.
CPC ...... *B25B 23/1425* (2013.01); *B25B 23/1427* (2013.01)

(58) Field of Classification Search
CPC ......... B25B 13/02; B25B 13/06; B25B 13/10; B25B 13/44; B25B 13/46; B25B 13/48; B25B 13/481; B25B 23/0021; B25B 23/142; B25B 23/1425; B25B 23/1427; B25F 5/006; B25F 5/02; B25F 5/027; B25D 11/00; B25D 11/04; B25D 17/00; B25D 17/04; B25D 2250/041
See application file for complete search history.

(56) References Cited

U.S. PATENT DOCUMENTS 2,940,345 A * 6/1960 Farina ..................... B25B 13/26
81/380
5,172,773 A * 12/1992 Meister ..................... B25F 5/00
173/170

FOREIGN PATENT DOCUMENTS

DE 20-2007-016669 * 2/2008
DE 202007016669 U1 2/2008

OTHER PUBLICATIONS

Extended European Search Report, EP Application No. 23154461.0, Jul. 14, 2023, 5 pages, EPO.

* cited by examiner

*Primary Examiner* — Robert J Scruggs
(74) *Attorney, Agent, or Firm* — Kofi A. Schulterbrandt

(57) ABSTRACT

The present invention discloses a wire holder configured to manage the wire of a loadcell assembly within a digital torque wrench. The wire disclosed wire holder includes a body having a neck and a first arm and second arm that form a clip. The clip is configured to secure the body to a casing structure within the digital torque wrench. The wire holder is characterized in that it further includes a groove formed between first and second walls that run down neck and one of either the first or second arms. The groove is configured to receive a wire from the loadcell and facilitate the coiling of said wire about the casing structure above the clip as the wire holder translates up and down the casing structure.

10 Claims, 11 Drawing Sheets

TORQUE WRENCH WIRE HOLDER

CROSS-REFERENCE TO RELATED APPLICATIONS

This application claims priority to EP Patent Application No. 23154461.0, filed on Feb. 1, 2023, which is incorporated herein by reference in its entirety.

FIELD OF THE INVENTION

The present invention relates to a torque wrench for applying torque to fasteners. More specifically, the present invention relates to a digital torque wrench having wire holder that manages the loadcell wire and keeps the same from being tangled or otherwise interfering with the operation of the torque wrench.

BACKGROUND OF THE INVENTION

Torque wrenches are well known in the art. Typically, a torque wrench includes a fastener drive structure having a fastener engaging head, such as a ratchet-type head, and an elongated tang member extending from the head. The fastener drive structure is inserted within a casing structure. The fastener drive structure and the casing structure are pivotally connected by a pivot pin for relative pivotal movement between a normal position and a torque exceeded position. A tang engaging member is biased by a spring into engagement with a rear end portion of the tang member to maintain the fastener drive structure and the casing structure in the normal position during a torque applying operation. An adjuster is provided to adjust the stress in the spring. During the application of torque to the fastener, the spring maintains the fastener drive structure and the casing structure in the normal position until the torsional resistance offered by the fastener reaches a threshold level determined by the spring force. Upon reaching that torsional resistance, the manual force being applied to the casing structure pivots the casing structure relative to the fastener drive structure, thereby causing the casing structure to contact the fastener drive structure to create an audible "click." This "click" indicates to the user that the threshold level of torque has been reached.

Typically torque wrenches have been mechanical in nature. Recently, more and more wrenches are digital. Although they achieve a similar result as their mechanical counterparts, digital torque wrenches operate differently. One primary difference is the use of a loadcell. Within a digital torque wrench, loadcells may be a part of a loadcell assembly that also includes a loadcell holder, a wire and a printed circuid board assembly (PCBA). The wire of the loadcell assembly attaches the loadcell to the PCBA. As torque is applied to the loadcell, it is converted into a change in electrical resistance which can then be measured. While digital torque wrenches may have some advantages such as accuracy; it also has some drawbacks. For example, the management of the wire. If the wire is not managed, within the digital torque wrench, it may become tangled or otherwise interfere with the operation of the digital torque wrench. The present invention addresses this and other drawbacks.

SUMMARY OF THE INVENTION

The present invention is a wire holder, which is defined according to the appended claims.

BRIEF DESCRIPTION OF THE DRAWINGS

The accompanying drawings facilitate an understanding of the various embodiments of this invention. In such drawings.

DETAILED DESCRIPTION OF THE INVENTION

Figure 1:
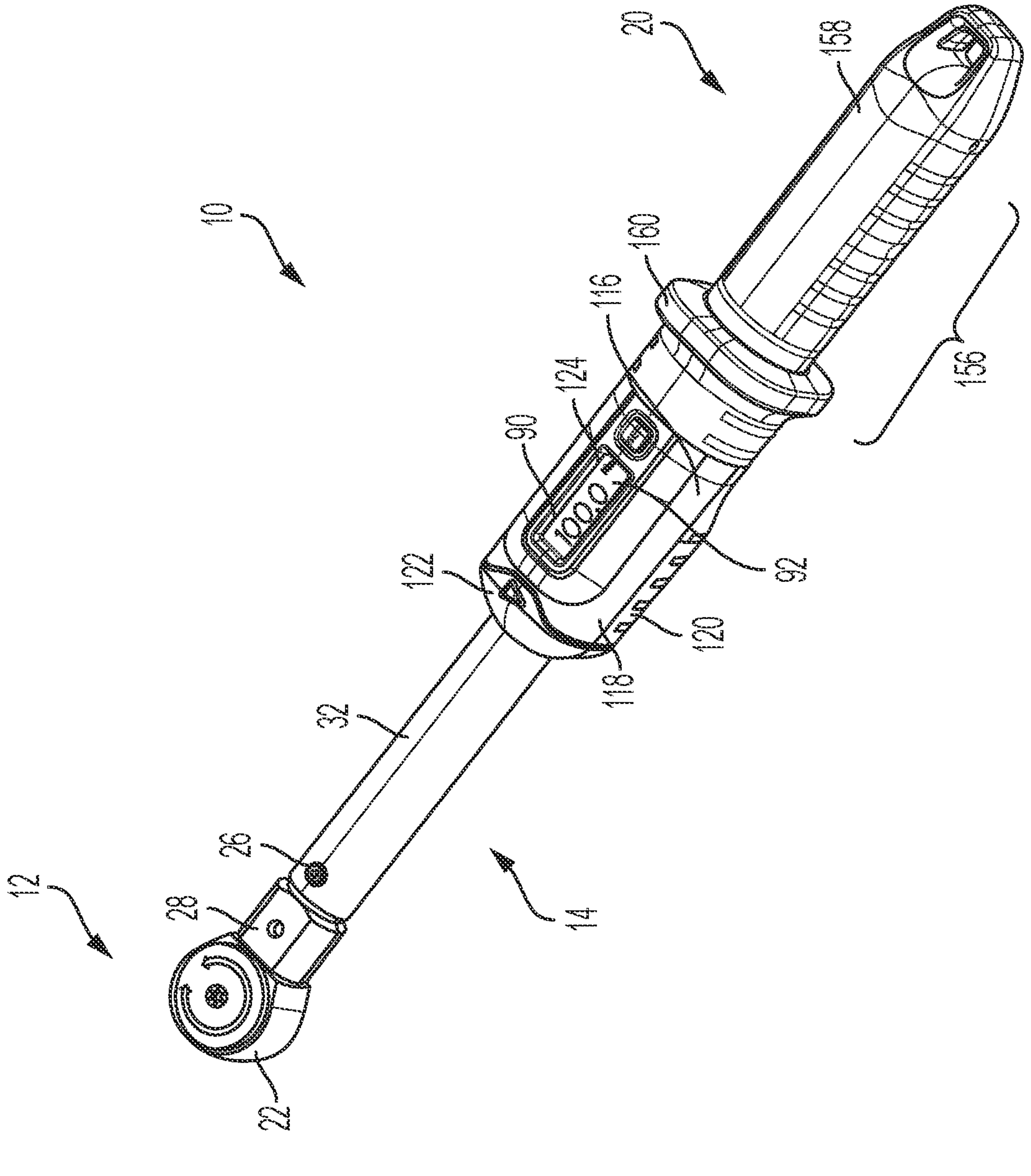
FIG. 1 is a perspective view of a digital torque wrench according to the present invention.
Figure 2:
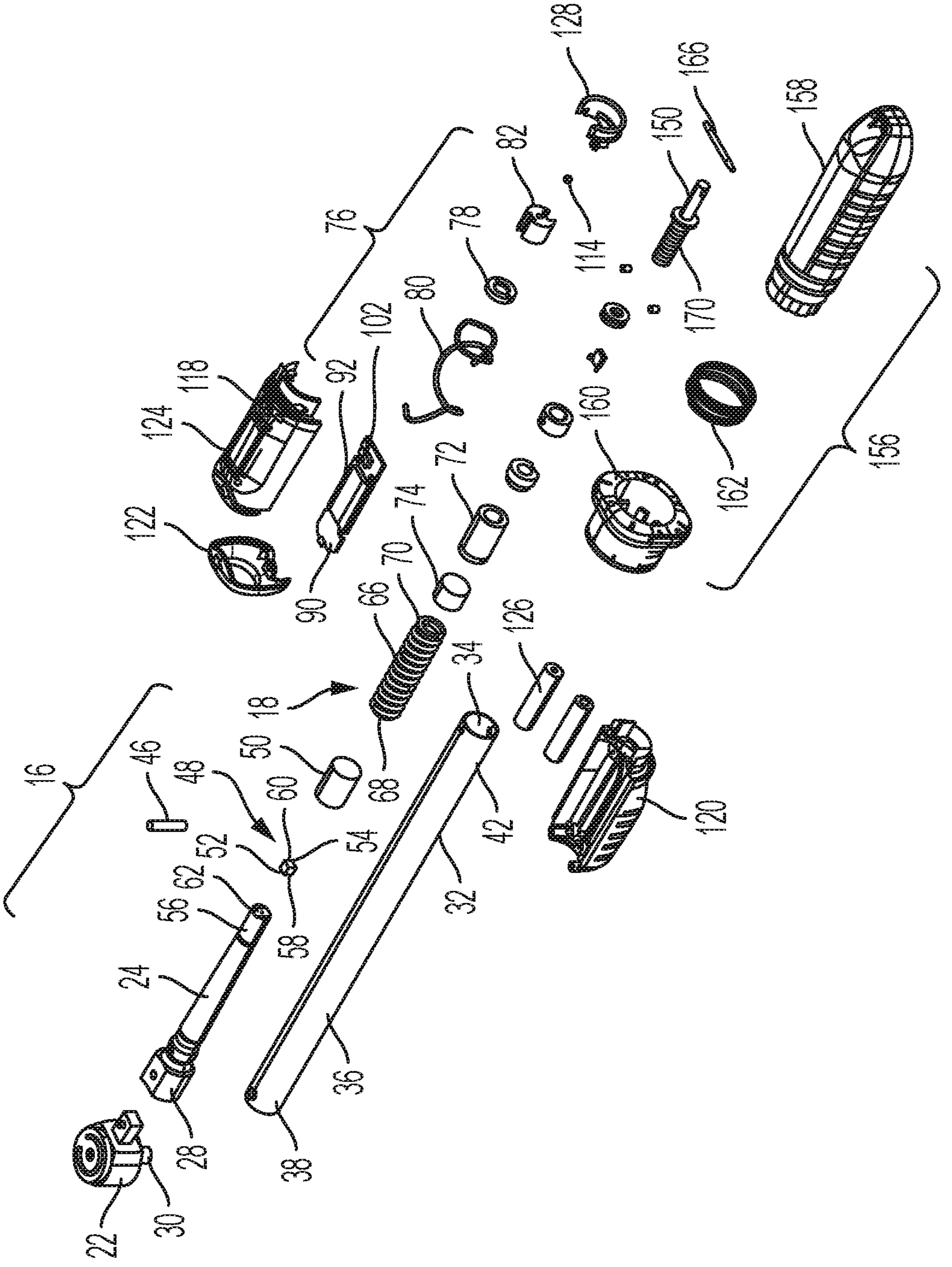
FIG. 2 is an exploded view of the digital torque wrench.

FIG. 1 shows a digital torque wrench, generally shown at 10, for selectively applying torque to fasteners. The main components of the digital torque wrench include a fastener drive structure, generally shown at 12, a wrench body, generally shown at 14, a tang engaging and stabilizing structure, generally shown at 16, a stressed biasing element, generally shown at 18, and an adjuster, generally shown at 20.

The fastener drive structure 12 has a head 22 constructed and arranged to be removably engaged with a fastener and a tang structure 24 extending rearwardly from the head 22. The tang structure 24 has a hole 26 extending through a front portion 28 thereof. In the embodiment shown, the head 22 is a conventional socket-type ratchet head. The head 22 comprises a mounting portion 30 that is configured to engage the tang structure 24. The head 22 also contains a conventional ratchet drive assembly (not shown), which is received within the mounting portion 30. The ratchet drive assembly is well known in the art and need not be detailed herein.

The wrench body 14 includes a generally cylindrical casing structure 32 with generally cylindrical interior and exterior surfaces 34, 36. One end portion 38 of the casing structure 32 has a hole 40 therethrough. The opposite end portion 42 is constructed to mount the adjuster 20, described in greater detail below.

The fastener drive structure 12 and the casing structure 32 are pivotally connected for pivotal movement relative to one another about a pivot axis 44 between a normal position, as shown in FIG. 1 and a torque exceeded position, wherein a torque exceeded signal is generated, as will be further discussed below. Specifically, the tang structure 24 of the fastener drive structure 12 is inserted within the casing structure 32 and the holes 26, 40 are aligned. Then, a pivot pin 46 is inserted through the holes 26, 40. As a result, the fastener drive structure 12 and the casing structure 32 pivot about the pivot pin 46, which defines the pivot axis 44.

The tang engaging and stabilizing structure 16, includes a tilt block 48 and a pusher 50. The tilt block 48 includes a forward end 52 and a rearward end 54. As will be discussed below, when the casing structure 32 is in its normal position the forward end flushly engages a rear end portion 56 of the tang 24, and the rearward end 54, flushly engages the pusher 50. The term "flushly" simply means that a substantial portion of said end surface is in direct contact with its respective counterpart surface. Conversely, when the casing structure 32 is in its torque exceeded position, an edge 58 of the tilt block that is adjacent the forward end engages the rear end portion of the tang, and another edge 60 that is adjacent the rearward end engages the pusher.

The rear end portion 56 of the tang structure 24 and the pusher 50 each have a recess 62, 64 formed therein. Tilt block 48, is received in the recesses 62, 64 and is movable between the recesses 62, 64 to accommodate pivotal movement of the casing structure 32 and the tang engaging and stabilizing structure 16 relative to the fastener drive structure 12.

Those skilled in the art will recognize that the tilt block 48 may be a cube. Thus, forward and rearward ends 52, 54 of the tilt block 48 each have a pair of generally parallel edges 58, 60. The tilt block 48 and the recesses 62, 64 are oriented such that the pairs of generally parallel edges 58, 60 are arranged generally parallel to one another. Further, the tilt block 48 is configured such that a distance between opposite edges of the forward and rearward ends 52, 54 thereof is greater than a distance between adjacent edges of the forward and rearward ends 52, 54 thereof.

Figure 3:
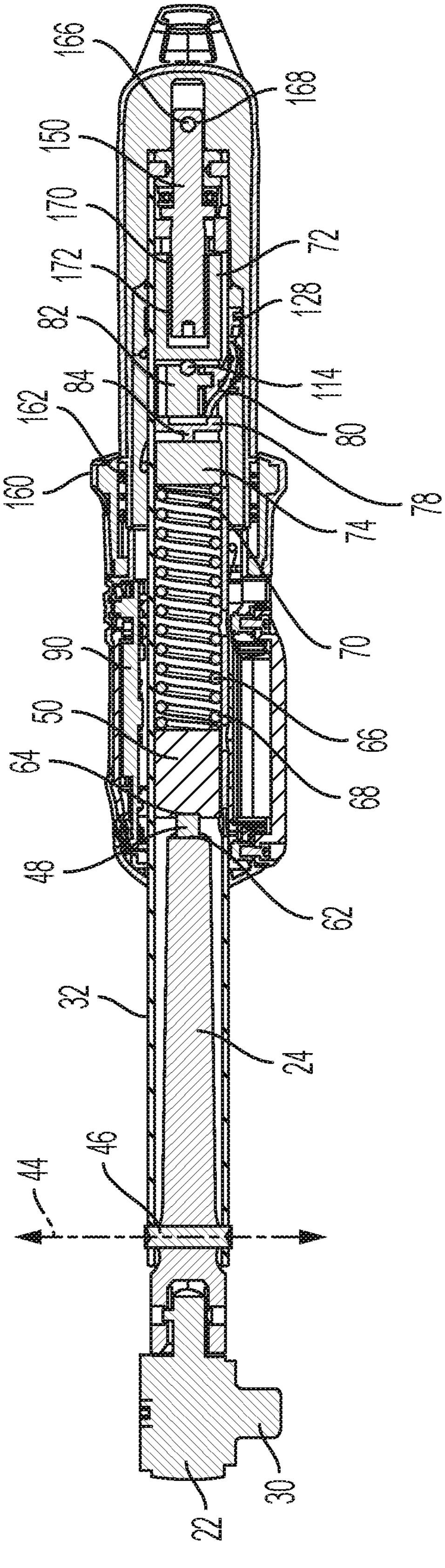
FIG. 3 is cutaway view of the digital torque wrench of FIG. 1.

The stressed biasing element 18, in the form of a coil spring 66, applies a biasing force to the tang engaging and stabilizing member 16 to maintain the recess 64 of the pusher 50 in engagement with the tilt block 48 so as to maintain the casing structure 32 and the fastener drive structure 12 in the normal position thereof, as shown in FIG. 3. One end 68 of the biasing element 18 engages against the pusher 50 and an opposite end 70 engages against a cylinder 72. In some embodiments, a spacer 74 may be disposed between the cylinder 72 and the end 70 of the biasing element 18.

In the disclosed embodiment of the digital torque wrench 10, a loadcell assembly 76 is disposed between the cylinder 74 and the adjuster 20. The loadcell assembly 76 includes a loadcell 78, a wire 80, and a loadcell holder 82. The disclosed loadcell 76 is a strain gauge. However, those skilled in the art will recognize that other types of transducers that convert force into measurable output can also be used. The loadcell 78 may be substantially disc-like in shape and may include a protrusion 84 upon which compression or force can be directed. The cross-sectional area of the protrusion 84 is less than that of the overall area of the loadcell. Force applied to the protrusion 84 causes a slight deformation in the loadcell. The magnitude of this deformation can be measured and converted into a measurable output. When said force is released, the deformation goes back to its original position. A first end 86 of the wire 80 is connected to the loadcell 78. The second end 88 of the wire 80 is attached to a printed circuit board assembly (PCBA) 90, which for our purposes may also be considered to be a part of the loadcell assembly 76.

Those skilled in the art will recognize that the PCBA 90 is a circuit board that includes all the electrical components for the digital torque wrench soldered thereto. Among the components included as a part of the PCBA 90 are a display 92 for showing an information relating to the operation of the digital torque wrench 10. Also included is a microcontroller unit 94, which functionally acts as the brain of the PCBA 90. The PCBA 90 may also include a power switch 96, and a variety of connectors, including a battery connector 98 and a loadcell connector 100. As will be discussed below, the disclosed PCBA 90 also includes a limit switch assembly 102, which includes a limit switch housing 104 and an actuator 106. Those skilled in the art will recognize that the aforementioned list of PCBA components is not exhaustive.

The final component of the loadcell assembly 76 is the loadcell holder 82. The primary function of the loadcell holder 82 is to secure the loadcell 78 in a position wherein an accurate measure of the force applied thereto can be measured. To optimize this function, it is critical that both rotational and axial movement of the loadcell 78 be limited. The disclosed loadcell holder 82 achieves this. First, rotational movement of the loadcell 78 is limited by one or more (preferably two) prongs 108 that extend away from a load cell engagement surface 107 of the loadcell holder 82. These prongs 108 are configured to be received within mating recesses 110 on a loadcell holder engagement surface 109 of the loadcell 78. In an alternate embodiment (not shown), the prongs can be on the loadcell, and the mating recesses can be in the loadcell holder. In yet another embodiment (also not shown), one prong and one mating recess can be in each of the loadcell and the loadcell holder. Irrespective of the embodiment, what is important is that the loadcell 78 and the loadcell holder 82 are connected to one another such that if any inadvertent rotational movement is applied, neither the loadcell nor the loadcell holder will rotate independent of one another.

Figure 8B:
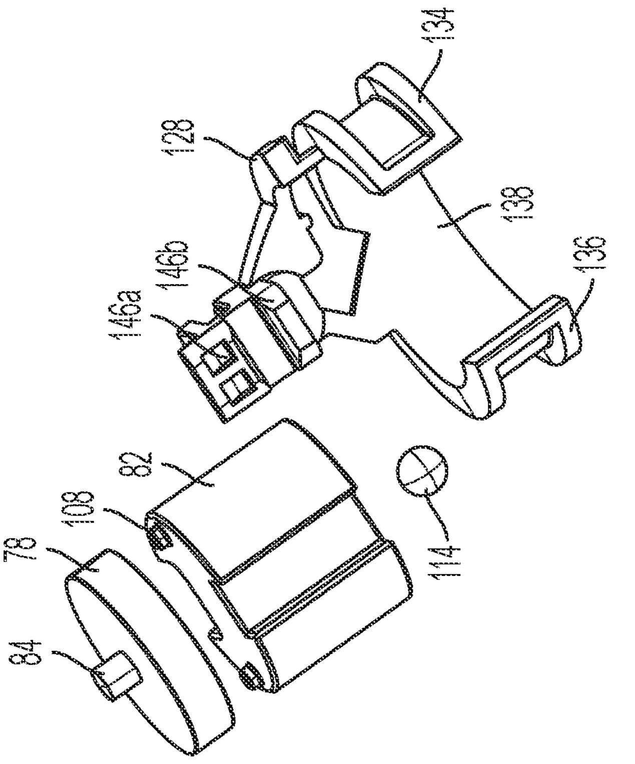
FIGS. 8*a* and 8*b* are alternate exploded views of the loadcell, loadcell holder and wire holder.
Figure 8A:
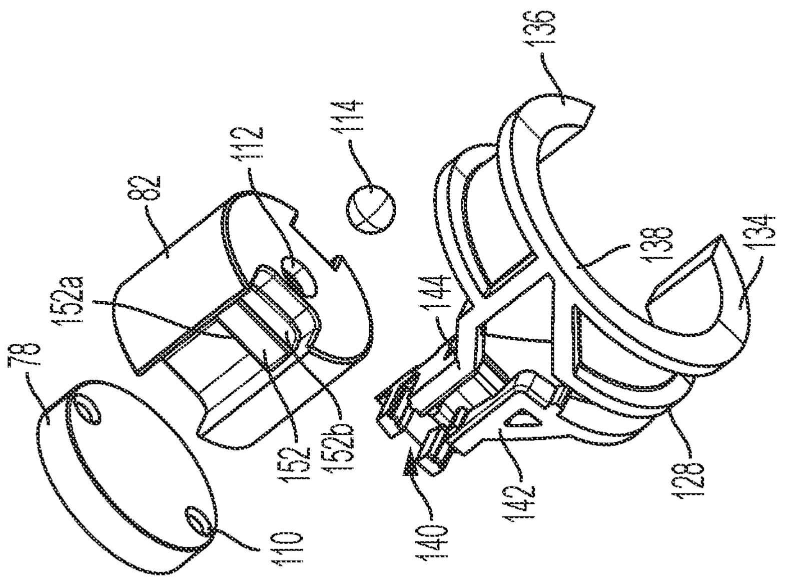

In addition to limiting rotational movement of the loadcell, the loadcell holder also limits its axial movement. This is achieved with the use of a detent or a rounded surface. As best seen in FIG. 8*a*, a surface of the loadcell holder may include a rounded or convex recess 112 into which a detent 114 may be inserted. The detent 114 may be a ball bearing or any other spherical shape sized such that when inserted into the convex recess 112 a portion of the detent extends away from the surface of the loadcell holder 82. In an alternate embodiment (not shown), a rounded surface may be integrated into the surface of the loadcell holder. The use of a detent or rounded surface works to limit axial movement of the loadcell by automatically aligning it with the loadcell holder and any force applied thereto. Ideally, the force applied to the loadcell holder would be perfectly perpendicular. In this situation, the force applied to the loadcell holder (and subsequently the loadcell), is also perpendicular and no axial movement is imparted to the loadcell. If the force applied to the loadcell holder is off center or otherwise orthogonal, this could lead to a tilt in the loadcell, which could make any readings therefrom inaccurate. The detent 114 or rounded surface combats any such off center force by automatically aligning the loadcell holder 82. Thus, axial movement that would otherwise be imparted to the loadcell 78 is limited.

Figure 4B:
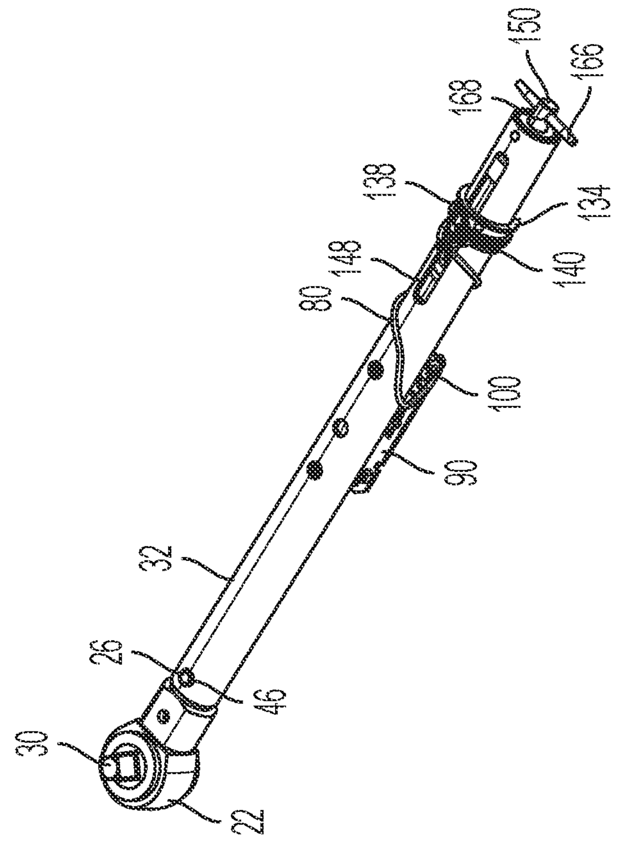
FIGS. 4*a* and 4*b* are alternate perspective partial views of the digital torque wrench showing the PCBA, the loadcell assembly, the wire holder and their respective positioning within the digital torque wrench.
Figure 4A:
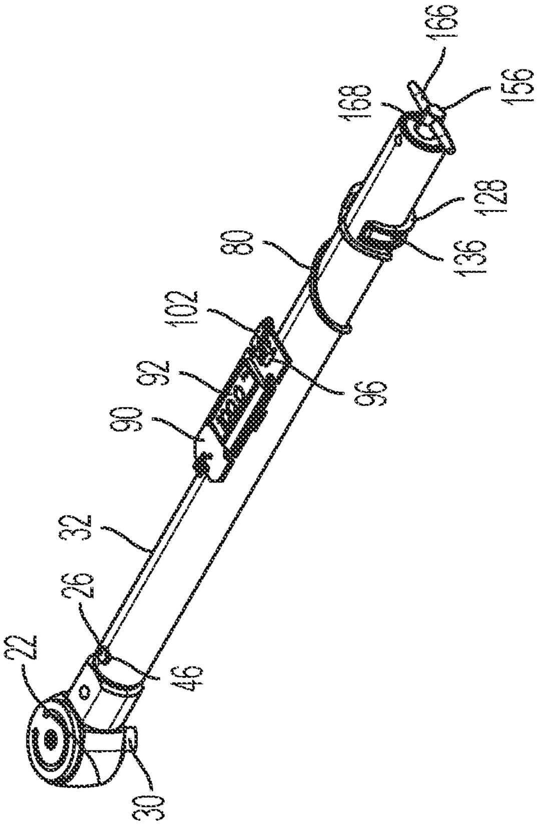
Figure 5:
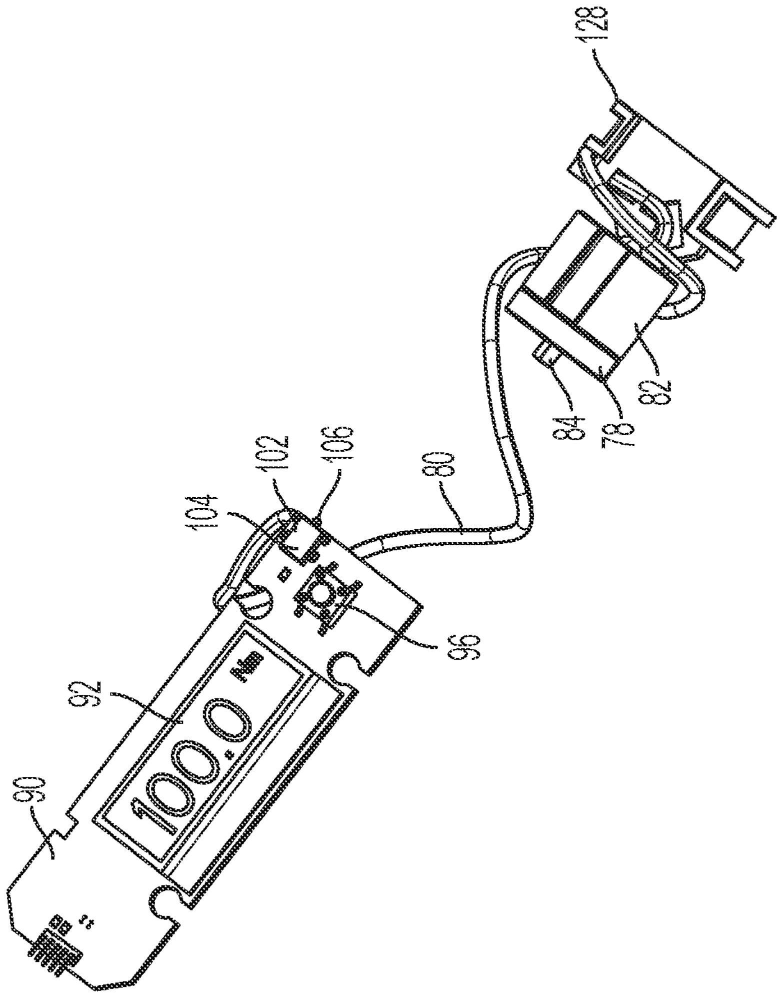
FIG. 5 is a perspective view of loadcell assembly and wire holder.
Figure 6:
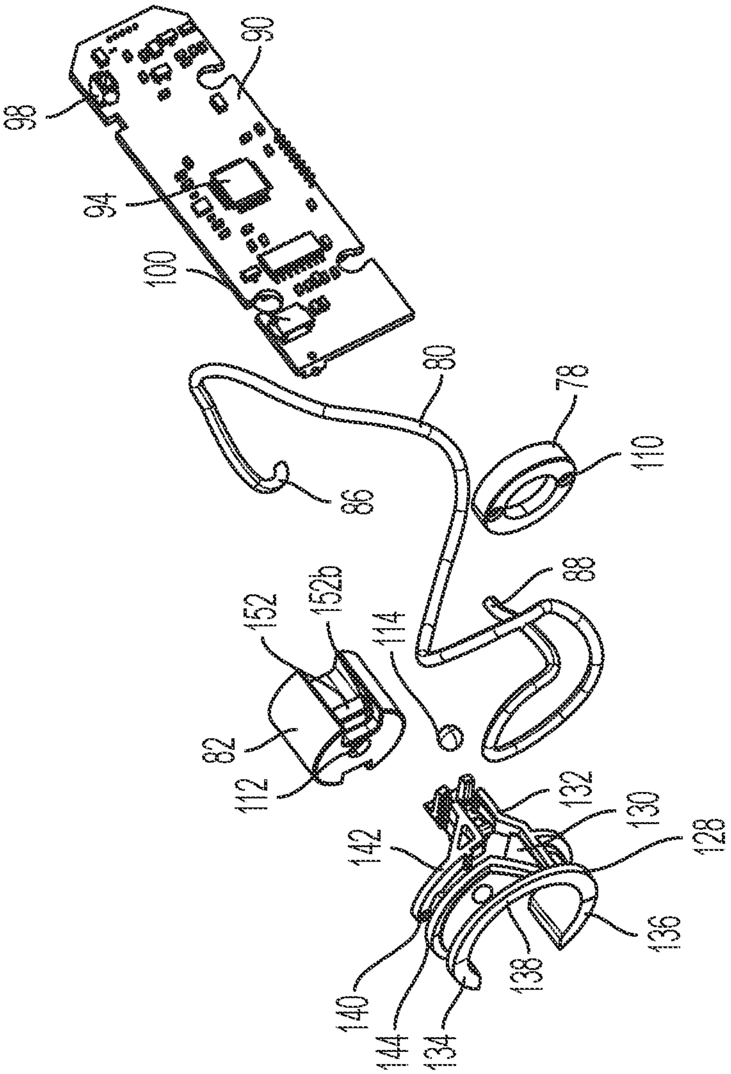
FIG. 6 is an alternate perspective and exploded view of the loadcell assembly and wire holder.
Figure 7:
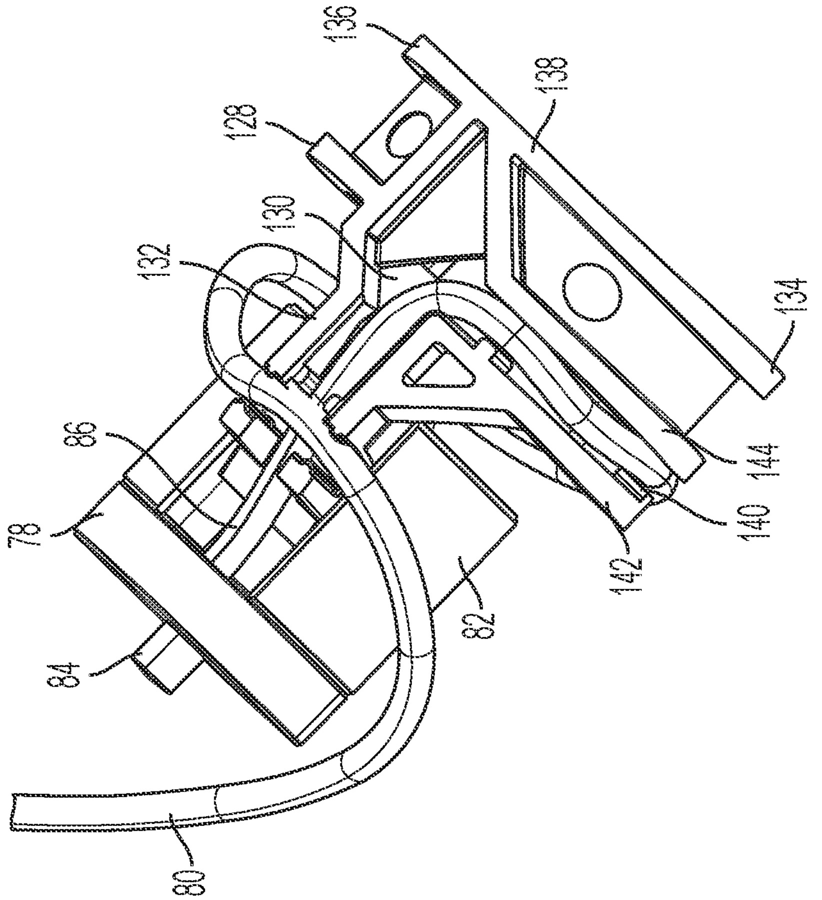
FIG. 7 is an alternate perspective view of the loadcell, wire, loadcell holder and wire holder.

As best seen in FIGS. 4*a* and 4*b*, the loadcell assembly 76 is partially positioned within the casing structure 32. However, the PCBA 90 and particularly the display 92 must be outside the casing structure 32 so that the user can see any relevant information. In a preferred embodiment as shown in FIG. 1, the PCBA is positioned between the casing structure 32 and a PCBA housing 116. The PCBA housing 116, may be a multipiece structure including an upper housing 118, a lower housing 120 and a cap 122. The upper housing 118 includes a window or opening 124 through which an operator can view the display 92 of the PCBA 90. In a preferred embodiment, the PCBA housing is sized to accommodate one or more power sources 126, such as a battery, which power the digital torque wrench 10.

With the loadcell 78 positioned within the casing structure 32 and the PCBA positioned outside the casing structure 32, the loadcell wire 80 must run from inside the casing structure 32 on one end 86 to the PCBA 90 (outside the casing structure 32) on the other end 88. Having the wire 80 both inside and outside the casing structure 32 can lead to tangling problems during operation of the digital torque wrench 10. To manage the wire 80, a wire holder 128 is utilized. The wire holder 128 includes a body 130 having a neck 132 and a first arm 134 and second arm 136 that form a clip 138, wherein said clip 138 is configured to secure the body to a casing structure 32 within the digital torque wrench 10. The wire holder 128 further includes a groove 140 formed between first and second walls 142, 144 that run down neck 132 and one of either the first or second arms 134, 136, and wherein said groove 140 is configured to receive the wire from the loadcell assembly and facilitate the coiling of said wire about the casing structure 32 above the clip 138 as the wire holder 128 translates up and down the casing structure 32. To facilitate said translation, the neck 132 may further include one or more protrusions 146 that extend away from the first and second walls 142, 144, wherein said protrusions 146 are configured to extend into a slot 148 of the casing structure 32 and engage an element of the digital torque wrench 10 that translates in response to the rotational movement of the adjusting shaft 150. More specifically, the protrusions 146 may engage a part of the loadcell assembly 76. Even more specifically, the protrusions 146 may engage a wire holder engagement portion 152 on the loadcell holder 82. The wire holder engagement portion 152 may be a shelf-like structure on a side of the loadcell holder 82. More specifically, the wire holder engagement portion 152 may be positioned in one or more grooves 115 in the loadcell holder. These grooves 115 also receive and guide the wire 80 of the loadcell 78. To facilitate engagement, the protrusions 146 may be positioned so that there is at least one upper protrusion **146*a* and at least one lower protrusion 146*b*. In a preferred embodiment, the space between the upper protrusion 146*a* and lower protrusion 146*b* is sized to respectively engage an upper and lower surface 152*a*, 152*b* of the wire holder engagement portion 152**.

Figure 9A:
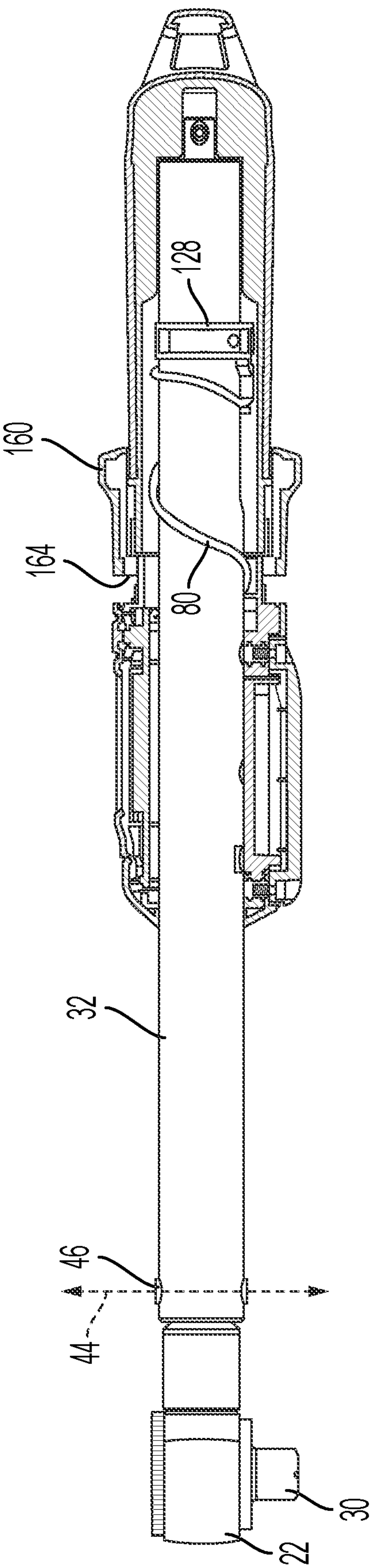
FIGS. 9*a* and 9*b* are alternate cutaway views of the digital torque wrench respectively showing the wire of the loadcell assembly in its loose and tight positions.
Figure 9B:
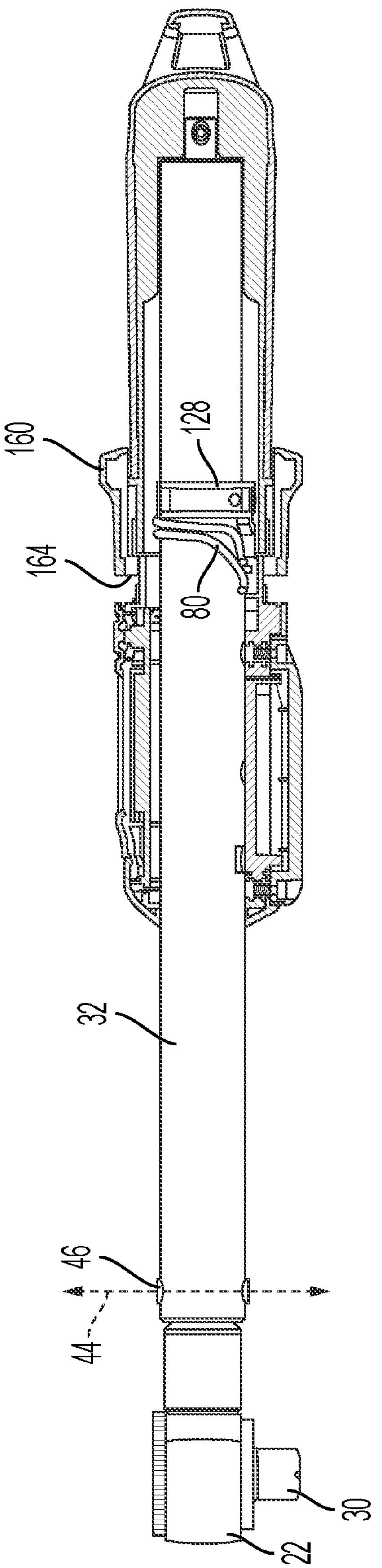

FIGS. **9*a* and 9*b* respectively show how the wire holder 128 manages the coiling of the wire 80. In FIG. 9*a*, the wire holder has been translated so that it is distal from the head 22. In this position, the wire 80 is loosely coiled about the casing structure 32. However, when the wire holder is translated closer to the head 22 as seen in FIG. 9*b*, the wire holder 128 tightly coils the wire 80 about the casing structure. The wire holder 128 thus manages the orderly coiling of the wire during operation of the digital torque wrench. Thus, the wire 80** will not become pinched or otherwise interfere with the operation of the wrench.

Figure 10:
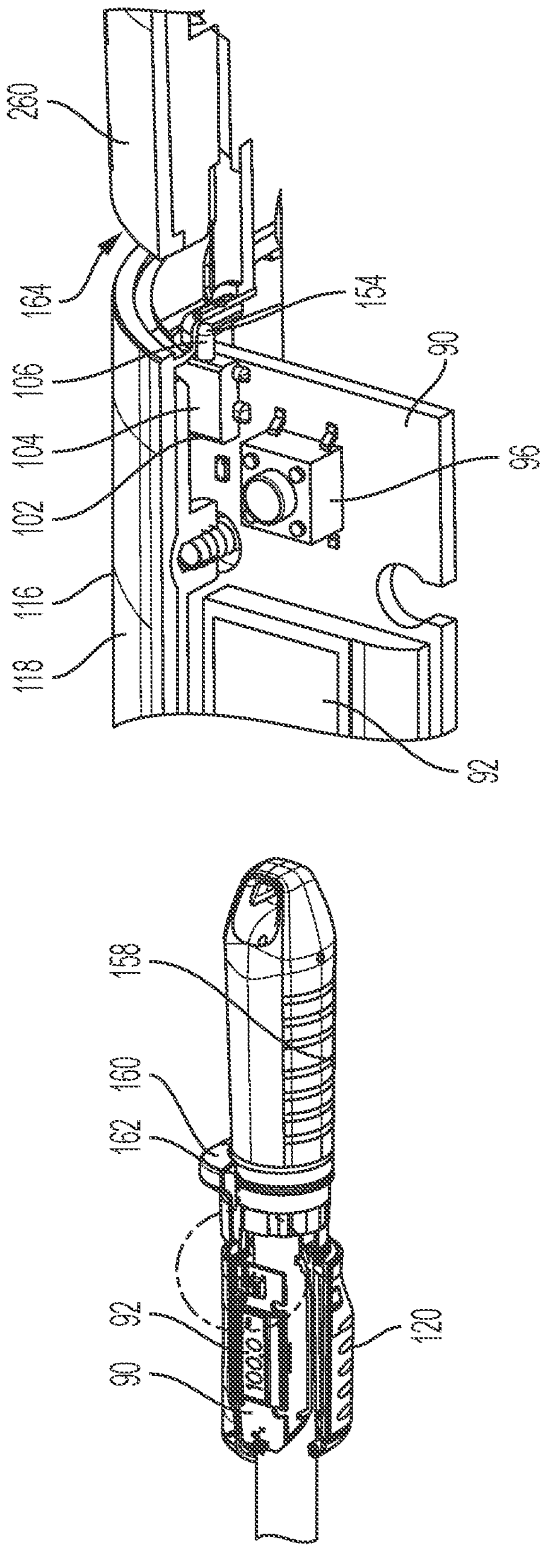
FIG. 10 is a perspective partial view of the digital torque wrench with its locking ring in the unlocked position, and the inset showing the limit switch in its first position.
Figure 11:
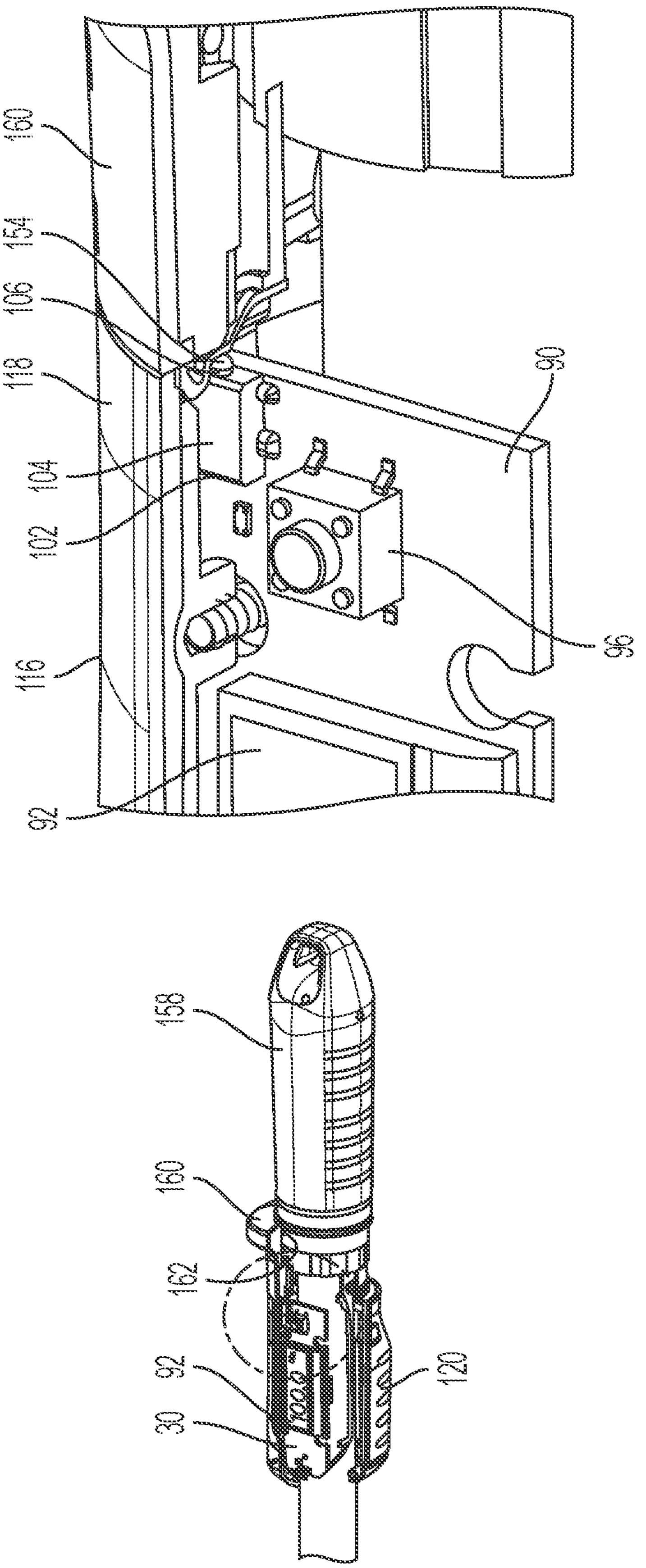
FIG. 11 is a perspective partial view of the digital torque wrench with its locking ring in the locked position, and the inset showing the limit switch in its second position.

The PCBA 90 of the digital torque wrench 10 also includes a limit switch assembly 102. The limit switch assembly 102 is configured to stabilize the readout on the display during operation. The limit switch assembly 102 includes a housing 104, and an actuator 106 partially disposed therein. The actuator 106 includes a switch end (not shown) that is disposed within the housing 104, and an engagement end 154 is positioned outside of the housing 104. The actuator is configured to be movable between a first position, wherein the engagement end 154 is distal from the housing 104 (see FIG. 10), and a second position, wherein the engagement end 154 is adjacent the housing (see FIG. 11). In a preferred embodiment, the actuator 106 is biased toward its first position. In the first position, the switch end of the actuator closes a circuit, and in the second position, the switch end opens a circuit. Those skilled in the art will recognize that in an alternate embodiment the actuator may open a circuit in its first position and close a circuit in the second position.

The limit switch assembly 102 is positioned on the PCBA 90 such that the actuator 106 can be moved between its first and second positions with the handle assembly 156. The handle assembly 156, which is a part of the adjuster 20, includes a handle 158 and a locking ring 160 that is biased by a spring 162. The locking ring 160 is configured to prevent unwanted rotational movement in the handle 158. The locking ring 160 is movable between a first and second position. In the first position, the locking ring limits rotation of the handle 158. In the second position, the locking ring permits rotation of the handle 158. Thus, when the locking ring is in its second position, inadvertent adjusting of the digital torque wrench 10 is avoided. In operation, a user may pull the locking ring 160 against the bias of the spring 162 toward its second position. This unlocks the handle and permits rotational movement of the handle 158. When the user releases the locking ring 160, the spring biases the locking ring back into its first position where rotational movement of the handle is limited. The locking ring 160, also includes a limit switch engaging surface 164. The spring 162 biases the locking ring, and more specifically, the limit switch engaging surface 164 into contact with the limit switch actuator 106. The force of the spring 162 is greater than that of the biasing element that biases the actuator towards its first position. Thus, in the absence of any external forces, the actuator 106 is held in its second position.

The operation of the digital torque wrench 10 will now be described in greater detail. The first step is to adjust the digital torque wrench to the desired torque level setting. For example, if an operator wishes to set the digital torque wrench to 100 N-m she will pull down the locking ring 160 and rotate the handle 158. Rotation of the handle 158 causes a series of interconnected elements to advance (or retract) against the biasing element 18. Those skilled in the art will recognize that the biasing element 18 may be a coil spring 66. As best seen in FIG. 3, the interconnected elements between the handle 158 and the coil spring 66 may include a handle pin 166 the ends of which are engaged to the handle 158. The handle pivot pin 166 is also disposed in an aperture 168 of the adjusting shaft 150. The adjusting shaft 150 further includes a threaded portion 170 that engages a mating threaded portion 172 on the interior of cylinder 72. The engagement of mating threaded portions 170 and 172 thus causes the cylinder 72 to be advanced (or retracted) in response to the handle 158. The loadcell assembly 76, which as described above includes a loadcell holder 82 and a loadcell 78, is disposed adjacent the cylinder 72. Finally, a spacer 74 is disposed between loadcell 78 and the coil spring 66.

The rotation of the handle 158 will cause the cylinder 72, loadcell assembly 76 and spacer 74 to advance against the coil spring 66. This advancement will impart force onto the protrusion 84 of the loadcell 78 within the loadcell assembly 76. Force applied to the protrusion 84 causes a slight deformation in the loadcell 76. The magnitude of this deformation can be measured and converted into a measurable signal. This signal is transferred from the loadcell 76 to the PCBA 90 via wire 80. The micro-controller 94 of the PCBA 90 converts the signal into N-m, in our example, 100 N-m, which is displayed on the display 92. Once the desired torque level is achieved, the operator may release the locking ring 160. The digital torque wrench can then be used to apply torque to a workpiece.

Except for the PCBA 90 and the wire 80, each of the aforementioned interconnected elements are disposed within the casing structure 32. The PCBA is outside of the casing structure 32, and the wire 80 runs between the PCBA 90 to the loadcell 78 via slot 148. The various rotation and translation of interconnected elements can cause the wire 80 to become tangled and/or pinched between moving parts. To manage the wire 80, a wire holder 128 is utilized. The first and second arms 134, 136 of the wire holder form a clip 138 that is configured to secure the wire holder 128 to the casing structure 32. The groove 140 of the wire holder is configured to receive the wire from the loadcell assembly and facilitate the coiling of said wire about the casing structure 32 above the clip 138 as the wire holder 128 translates up and down the casing structure 32.

As the interconnected elements are translated and force is applied to the loadcell 78, it is critical that both rotational and axial movement of the loadcell 78 be limited to obtain accurate loadcell measurements/readings. The loadcell holder limits rotational movement with prongs 108 that extend away from its surface and are disposed within mating recesses 110 on an adjacent surface of the loadcell 78. The loadcell holder 82 limits axial movement with a detent 114 that is disposed in a convex recess 112 in a surface of the loadcell holder 82 such that a portion of the detent extends away from said surface. The detent limits axial movement of the loadcell by automatically aligning it with the loadcell holder and any force applied thereto.

Going back to our example, after the digital torque wrench 10 is adjusted to 100 N-m, the operator may begin to apply torque to a work piece. Those skilled in the art will recognize that when 100 N-m of torque is reached, the tilt block 48 will partially rotate between the pusher 50 and tang 24. This rotation will cause the familiar break or "click" that informs the operator that she has reached the desired torque level. Prior to the present invention, digital torque wrenches that utilize a loadcell may experience an unwanted jump in torque measurement that led to a temporary display reading 110 N-m or more. This inaccurate temporary reading is due to the extraneous forces that are applied when the torque wrench breaks. These forces may include vibrations of the casing structure, shear forces from the tilt block, friction forces, etc. Eventually these forces dissipate and the reading on the display may go back to the desired level. However, by then it may be too late as the operator may have already applied (or removed) torque to reach what she understood to reach her desired level.

The digital torque wrench 10 of the present invention avoids these inaccurate readings by always preventing these inaccurate temporary jumps in display readings. This is achieved through the use of the limit switch assembly 102. The limit switch assembly 102 is configured to stabilize the readout on the display during operation of the torque wrench.

When an operator pulls down the locking ring 160 to begin adjustment to the desired torque level, she disengages the limit switch engaging surface 164 from the actuator 106 of the limit switch assembly 102. A biasing element within the limit switch housing 104 moves the actuator 106 towards its first position, wherein the engagement end 154 of the actuator 106 is distal from the limit switch housing 104. When the actuator 106 is in this first position, the micro-controller 94 will continually read the force measurement signals received from the loadcell 78, convert them to torque, and display the real-time torque. The torque wrench may then be adjusted to the desired level, for example, 100 N-m. The operator may then release the locking ring 160. Spring 162 moves the locking ring 160 back toward its first position such that the limit switch engaging surface 164 thereof contacts the actuator 106 and pushes it back into the limit switch housing 104. This is the second position of the actuator 106. When the actuator 106 is moved to its second position, the micro-controller 94 marks the last received force measurement from when the actuator 106 was in the first position as Fset and displays the corresponding torque as Tset. In our example, the micro-controller 94 records the last received force measurement as Fset and converts it to the corresponding torque Tset, or 100 N-m. All subsequent force signals received from the loadcell 78 will be converted torque and compared to Tset.

The operator then uses the digital torque wrench 10 to apply torque to the work piece. During this process, force is applied to the loadcell 78. These forces are marked by the micro-controller 94 as F1, converted to torque T1 and then compared to Tset. If T1 is less than Tset or within a predetermined range thereof, the micro-controller 94 will display the corresponding torque measurement T1. Alternatively, if T1 is greater than Tset and outside the predetermined range, the micro-controller 94 will display Tset. Those skilled in the art will recognize that the predetermined range is dependent on the digital torque wrench's desired level of accuracy, and thus may be any percentage (plus or minus) of Tset. For example, the predetermined range may be 4%.

Going back to our example, as the operator uses the digital torque wrench, varying levels of force are applied to the loadcell. At any given time, the micro-controller reads this force as F1, converts it to its corresponding torque T1, compares it to Tset and then displays a value according to rules set forth in the previous paragraph. In our example, where Tset is 100 N-m and the predetermined range is 4%, exemplary values may be as those set forth in the following table:

| Real Time Converted Torque T1 | Displayed Torque Reading |
|---|---|
| 90 N-m | 90 N-m |
| 97 N-m | 97 N-m |
| 103 N-m | 103 N-m |
| 110 N-m | 100 N-m |

As can be seen, in those instances where the real time converted torque T1 is less than Tset or within the predetermined range (plus or minus 4%) thereof, the micro-controller displays the real time converted torque T1. However, in those instances wherein the real time converted torque T1 is both greater than Tset and outside of the 4% range, the micro-controller displays a value of Tset. This prevents a display of an unwanted real time converted torque value T1 caused by jump in reading due to the "click" and extraneous forces.

When an operator is using the digital torque wrench, force will eventually be applied to the loadcell having a converted real time torque T1 that approaches Tset. As greater and greater torque is applied, the value eventually reaches 100 N-m and the digital torque wrench breaks or clicks. At this moment, the extraneous forces may be applied to the load-cell 78. These extraneous forces may have a converted real time torque T1 of 110 N-m. Displaying this erroneously high T1 is to be avoided. Thus, the micro-controller of the present invention, recognizes that the limit switch actuator is in its second position and thus displays real time converted torque values according to the aforementioned rules. Thus, the value of Tset (100 N-m) will be displayed.

Following the break, the extraneous forces dissipate. To be sure that the wrench has torqued the workpiece to the desired level, the micro-controller 94 may, after a predetermined amount of time, take another force measurement F2, convert that to a real time torque T2 and compare that to Tset. Said predetermined amount of time may be, for example, 2 seconds. If T2 is greater than Tset and outside a predetermined range away from Tset, the micro controller will display a visual indicia indicating the torque is greater than Tset. For example, the micro-controller might display the word, "HI" or another indication that the torque is greater than Tset. Alternatively, if T2 is less than Tset and outside a predetermined range away from Tset, the micro-controller will display a visual indicia indicating the torque is less than Tset. Thus, the micro-controller might display the word, "LO" or another indication that the torque is less than Tset. Finally, if T2 is within the predetermined range of Tset, the micro-controller 94 will display Tset.

This final display of Tset will be in the operator's indication that she has reached the desired torque level and that she should stop applying torque. In order to confirm the same, the micro-controller may provide a secondary indication of having reached the desired level. Said secondary indication may be visual, such as a flashing display of the Tset value. The secondary indication may be audible, such as a beep. The secondary indication may also be tactile, such as a vibratory response. Those skilled in the art will recognize that the secondary indication may also be a combination of the visual, audible or tactile responses.

It can thus be appreciated that the various objectives of the present invention have been fully and effectively accomplished. The foregoing specific embodiments have been provided to illustrate the structural and functional principles of the present invention and is not intended to be limiting. To the contrary, the present invention is intended to encompass all modifications, alterations, and substitutions within the spirit and scope of the appended claims.

The invention claimed is:

1. A wire holder configured to manage a wire of a loadcell assembly within a digital torque wrench, said wire holder comprising:

a body having a neck and a first arm and second arm that form a clip, wherein said clip is configured to secure the body to a casing structure within the digital torque wrench; and characterized in that said wire holder further includes a groove formed between first and second walls that run down the neck and one of either the first or second arms, and wherein said groove is configured to receive a wire from the loadcell and facilitate the coiling of said wire about the casing structure above the clip as the wire holder translates up and down the casing structure.

2. The wire holder of claim 1, wherein the neck further includes a protrusion that extends away from the first and second walls, and wherein said protrusion is configured to extend into a slot of the casing structure and engage an element of the digital torque wrench that translates in response to a rotational movement of an adjusting shaft of the digital torque wrench.

3. The wire holder of claim 2, wherein the element that is engaged by the protrusion is a part of the loadcell assembly.

4. The wire holder of claim 3, wherein the element that is engaged by the protrusion is a loadcell holder.

5. The wire holder of claim 3, wherein on the neck the first and second walls further includes openings that are substantially parallel to the groove, said openings being sized to receive and secure the wire therebetween.

6. The wire holder of claim 2, wherein at least one of the first or second walls further includes a tooth that extends into the groove and is configured to engage the wire and press fit it against the other of the first or second walls.

7. The wire holder of claim 2, wherein on the neck the first and second walls further includes openings that are substantially parallel to the groove, said openings being sized to receive and secure the wire therebetween.

8. The wire holder of claim 1, wherein at least one of the first or second walls further includes a tooth that extends into the groove and is configured to engage the wire and press fit it against the other of the first or second walls.

9. The wire holder of claim 1, wherein on the neck the first and second walls further includes openings that are substantially parallel to the groove, said openings being sized to receive and secure the wire therebetween.

10. The wire holder of claim 1, wherein the wire is made of plastic or polyprolene.

* * * * *